Nov. 7, 1939. P. BROWN 2,179,322
AUTOMOBILE HEATER
Filed Nov. 19, 1937
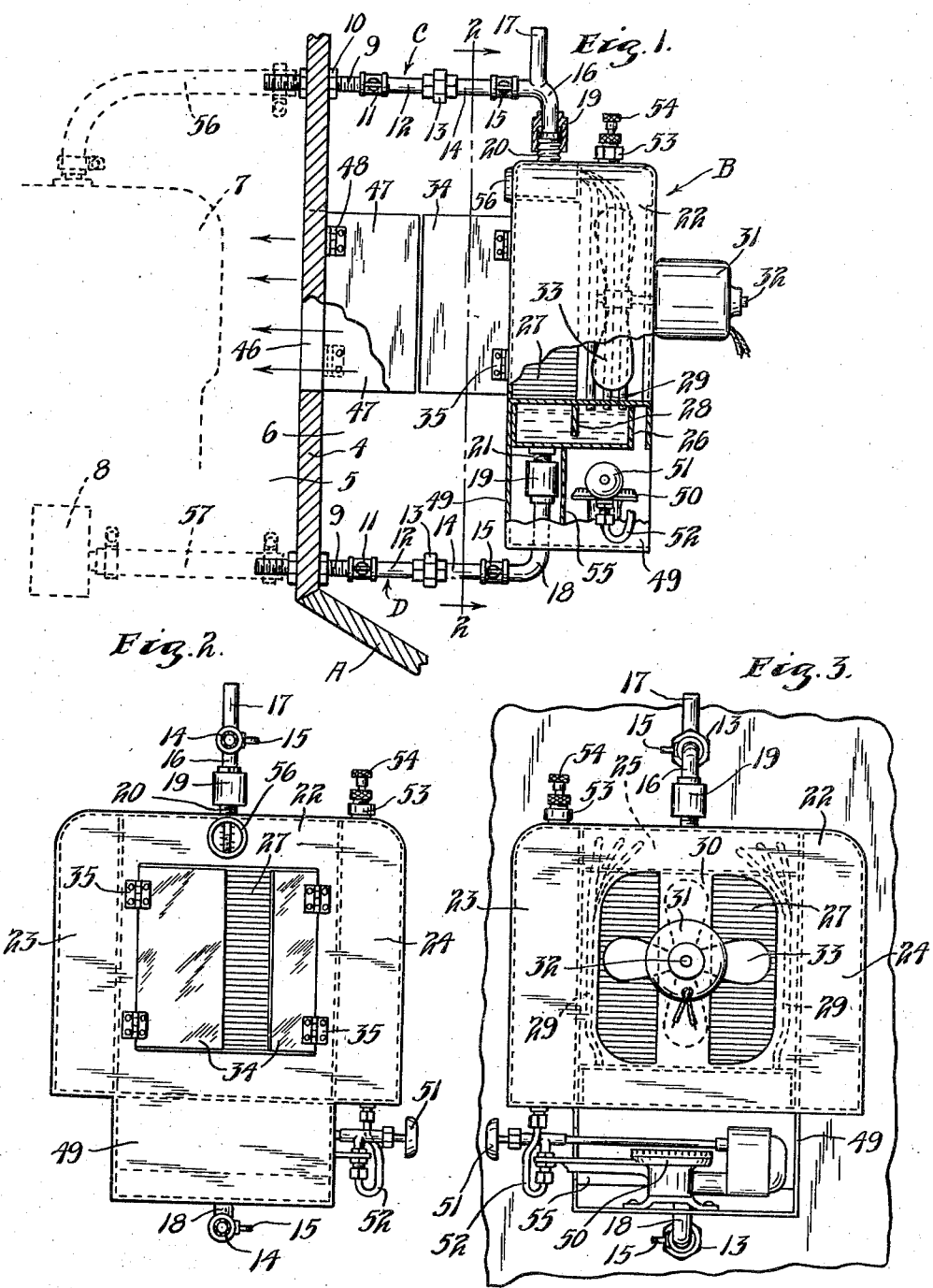
INVENTOR.
PERRY BROWN.
BY HIS ATTORNEYS.
Williamson & Williamson Patented Nov. 7, 1939

2,179,322

UNITED STATES PATENT OFFICE 2,179,322

AUTOMOBILE HEATER

Perry Brown, Sherwood, N. Dak.

Application November 19, 1937, Serial No. 175,441

6 Claims. (Cl. 237—12.3)

This invention relates to heaters for automobiles and other vehicles.

It is one object of the present invention to provide a novel and improved automobile heater including a heating radiator and fan mounted to drive air through the radiator and means for heating the radiator from the water circulating system of an automobile or from an independent heat source, or by both.

A further object is to provide a novel automobile heater which can be employed for either forcing a circulation of warm air within a closed body of an automobile or can be employed for forcing heated air about the engine of an automobile to preheat the engine for ease in starting in cold weather.

Another object is to provide a water heater which can be heated by the water circulating system of an automobile or by an independent heat source, or by both, and which can be readily removed from the automobile and operated successfully for heating any desired space.

The objects and advantages of the invention will more fully appear from the following description, made in connection with the accompanying drawing, wherein like reference characters refer to the same or similar parts throughout the various views, and in which, Fig. 1 is a view taken chiefly in vertical section through the dashboard of an automobile equipped with a heater embodying the invention, some of the parts being broken away and other parts being shown in section, and the heater being so disposed as to circulate air on and about the engine of the automobile;

Fig. 2 is a vertical section taken substantially on the line 2—2 of Fig. 1, as indicated by the arrows, and Fig. 3 is a view taken from the right of the structure shown in Fig. 1.

Referring to the drawing, portions of the closed interior body A of an automobile are shown including the dashboard 4 which separates the engine pit 5 from the interior chamber 6 of the body. An automobile engine 7 is indicated in dotted lines as being located in the engine pit 5 and the water circulating pump of the engine is also shown in dotted lines and designated by the numeral 8.

In accordance with the invention a pair of nipples 9 are mounted in vertically spaced relationship in the dashboard 4, these nipples of course extending both forwardly and rearwardly from the dashboard and being secured thereto by nuts 10. Shut-off valves 11 are connected to the rear extensions of the nipples 9 and short pipe sections 12 are in turn connected to the valves 11 and unions 13 are attached to the rear ends of the short pipe sections 12. Other pipe sections 14 are connected to the unions 13 and project rearwardly therefrom to connect with other shut-off valves 15. The upper valve 15 is connected to a pipe section 16 having a downturned branch at its rear end and having an upturned extension 17 which is open at its upper end to form an air and steam escape for the radiator which will be presently described. The opening at the top of the extension 17 is preferably located slightly higher than any other part of the water circulating system of the automobile. Connected to the lower valve 15 is a pipe section 18 forming an upturned elbow. Swivel joints 19, the upper one of which is shown in section in Fig. 1, connect the lower end of the pipe section 16 and the upper end of the pipe section 18 respectively, to upper and lower nipples 20 and 21 respectively of a hot water radiator assembly designated as an entirety by the letter B.

The radiator assembly B includes a casing 22 forming at one side of the assembly a tank 23 for the storage of liquid fuel such as gasoline and forming at the other side of the assembly preferably a chamber 24 which balances up the appearance of the radiator assembly. Extending between the fuel tank 23 and the chamber 24 at the top of the casing 22 is an upper header 25 for the radiator, this upper header being preferably comparatively narrow. At the lower part of the casing 22 a lower header 26 extends between the fuel tank 23 and the chamber 24 and this header 26 is preferably considerably wider than the upper header 25 and it projects preferably rearwardly of the header 25. A plurality of fin-equipped vertical water tubes 27 extend between the upper and lower headers 25 and 26 and connect therewith. In approximate alinement with the rear edges of the tubes 27, as viewed in Fig. 1, a baffle 28 is provided in the lower header 26 and this baffle runs down from the top of the header to a point closely adjacent but spaced somewhat above the bottom of the header 26. At the sides of the bottom header 26 and rearward of the baffle 28, as viewed in Fig. 1, a plurality of additional water tubes 29 are connected to the header 26 to communicate therewith and these tubes run upwardly and are somewhat forwardly bent at their upper ends to connect with and communicate with the upper header 25. The nipple 20 is, of course, mounted in the upper header 25 and the nipple 21 is mounted in the lower header 26.

Forward and rearward of the water tubes 27 the casing 22 is open but at the rear of these water tubes, as viewed in Fig. 1, a cross bar 30 extends across the opening and mounted on this cross bar is a small electric motor 31 having a motor shaft 32 to which a fan 33 is attached, this fan working adjacent the rear side of the water tubes 27 and being pitched to force air forwardly around the tubes 27. The forward opening in the casing 22 is adapted to be closed by a pair of doors 34 secured as by hinges 35 to the front of the casing 22.

In line with the front opening in the casing 22 there is an opening 46 formed in the dashboard 4 and this opening 46 is adapted to be closed by doors 47 secured as by hinges 48 to the dashboard 44. As best shown in Fig. 1, the spacing of the swivel joints 19 from the dashboard 4 is such that when the radiator assembly B is turned, as shown in Fig. 1, to face forwardly and the doors 34 and 47 are swung open, the doors may be brought into substantial alinement with their adjacent edges almost in abutment to form lateral confining members which assist in conveying heated air from the radiator assembly B forwardly through the dashboard opening 46 into the engine pit 5 to strike the engine and circulate therearound.

Connected to the bottom of the casing 22 is a strap 49 on which is mounted a liquid fuel burner 50 preferably of the type for burning vaporized gasoline and for vaporizing the gasoline prior to delivery from the burner head before burning. This burner 50 may be of any standard construction and, therefore, it is thought unnecessary to describe the same in detail. Suffice it to say that the burner is controlled by a valve 51 and gasoline is supplied to the generator tube of the burner from the tank 23 by means of a fuel conduit 52. The tank 23 is closed at its upper end by a filler plug 53 carrying therein an air pump 54 after the manner of the fuel tanks for gasoline stoves whereby air may be pumped into the fuel tank 23 to put the liquid fuel therein under air pressure. A vertical plate 55 preferably extends downwardly from the lower header 26 to the lower part of the strap 49 forward of the burner 50.

The two nipples 9 are connected to the water circulating system of the automobile in any suitable manner. As shown, the upper nipple is connected by a hose 56 with the water jacket of the engine 7 and the lower nipple 9 is connected by a hose 57 with the water pump 8.

The upper nipple 9, valve 11, pipe section 12, union 13, pipe section 14, valve 15, pipe section 16 and swivel joint 19 form an upper supporting conduit which may be designated as an entirety by the letter C for swively supporting the upper end of the radiator assembly B, and at the same time afford communication between the water circulating system and the radiator of the radiator assembly. Similarly, the lower nipple 9, valve 11, pipe section 12, valve 13, pipe section 14, valve 15, pipe section 18 and swivel joint 19 form a lower supporting conduit which may be designated as an entirety by the letter D for swively supporting the lower part of the radiator assembly B and at the same time affording communication between the water circulating system of the automobile and the radiator of the radiator assembly.

The radiator of the radiator assembly can be heated either by hot water from the water circulating system of the automobile or it can be heated by the burner 50 or by both. In case it is desired to heat the radiator of the assembly B by the hot water of the cooling system either alone or in conjunction with the burner 50, all the valves 11 and 15 will be open. Water from the cooling system of the car will be supplied through the upper supporting conduit C to the upper header 25 and will pass on downwardly through the water tubes 27 to the lower header 26 and thence out of the radiator through the lower supporting conduit D. In case the burner 50 is not used, some water will also circulate from the upper header 25 through the tubes 29 into the lower header 26. In case the burner 50 is put into service at the same time that hot water is being supplied to the radiator from the water circulating system of the car, a slightly different type of circulation will take place in the radiator of the radiator assembly B. The burner 50 is, of course, located below the rear portion of the lower header 26, as viewed in Fig. 1, and the burner will play on the header 26 to heat the water in the rear part of this header. This heated water will rise and move through the tubes 29 into the upper header 25, due partly to the provision of the baffle 28 and due partly also to the general down movement of water in the tubes 27. Of course, the motor driven fan 33 will be employed to force air rapidly through the radiator by movement of air around the tubes 27. Thus a blast of heated air will be delivered through the front opening in the casing 22, and by setting the doors 34 properly, direction can be given to the delivered warm air.

Normally when the heater is to be used for heating the interior chamber 6 of the car body, the radiator assembly B will be swung on the swivel joints 19 through 180° from the position shown in Fig. 1, so that the radiator assembly will face rearwardly to deliver heated air in the usual manner of most heaters into the interior chamber 6 of the automobile. By provision of the burner 50 used in conjunction with the hot water from the water circulating system of the car, much more heat can be developed in the radiator of the heater than would be the case if the hot water from the water circulating system alone were employed. Of course, the burner 50 alone can be used for heating the radiator and in such case, unless it is desired to heat the water of the circulating system of the car, the two valves 15 will preferably be closed. The burner 50 playing on the lower header 26 will cause hot water to rise and pass through the tubes 29 into the upper header 25 and from the upper header the water will circulate downwardly through the tubes 27 into the lower header 26 and pass beneath the baffle 28 to the portion of the lower header 26 which is most intensely heated by the burner 50. The extension 17 having an opening in its upper end permits the escape of any air or steam from the radiator.

It is often desirable to employ the burner 50 alone, inasmuch as by use of the burner alone to heat the radiator, the heater can be operated while the engine of the automobile is not running. Thus the interior of the car can be heated without running the engine. If the various valves 11 and 15 are left open when the burner 50 alone is employed for heating the radiator, water heated by the burner 50 can be circulated through the water cooling system of the engine to prevent freezing of this water and to warm the motor parts before starting in extremely cold weather.

Prior to starting an automobile in extremely cold weather, it is often desirable to heat the entire engine somewhat so as to loosen up the oil and permit of easy starting. By swinging the radiator assembly B on the swivel joints 19 so that the radiator assembly faces forwardly, as shown in Fig. 1, the heater can be employed for forcing air into the engine pit 5 and around the engine 7. When the radiator assembly is swung to this position the doors 34 and 47 will be opened and alined, as shown in Fig. 1, preferably the valves 15 will be closed and the burner 50 will be employed for supplying the necessary heat to the heater.

The radiator assembly B can be very easily removed from the automobile without necessarily draining the water from the said assembly and the radiator assembly can then be utilized for heating any desired space. To remove the radiator assembly, preferably all the valves 11 and 15 will be closed whereupon the unions 13 can be quickly loosened and the radiator assembly B is then in condition to be taken out of the automobile. It can be set up anywhere and employed for heating purposes by operation of the burner 50.

It is particularly contemplated that the present heater will be used in quite cold climates where much difficulty is experienced in starting automobiles in cold weather. It will be seen that a many purpose heater has been provided which is highly effective for the purposes intended.

It will of course be understood that various changes may be made in the form, details, arrangement and proportions of the various parts without departure from the scope of the present invention which, generally stated, consists in the matter shown and described and set forth in the appended claims.

Attention should perhaps be called to the fact that there is a thermometer 56 connected to the upper header 25 of the radiator to permit the temperature of the water in the radiator to be observed.

What is claimed is:

1. In an automotive vehicle, a dashboard having an opening therethrough, a pair of water conduits mounted in said dashboard and projecting rearwardly therefrom, a hot water radiator located behind said opening and swivelly connected to said conduits, and a fan carried by said radiator and located at one side thereof to blow air therethrough whereby said fan and radiator can be turned to blow air through said opening in said dashboard and said radiator and fan can be turned to blow air rearwardly from said dashboard.

2. The structure defined in claim 1, and an independent heater mounted for movement with said radiator and adapted to play on a portion thereof to heat the same.

3. A vehicle heater comprising a radiator having upper and lower headers, finned tubes extending between the forward portion of said lower header and said upper header, and other tubes extending between the rear portion of said lower header and said upper header, means for connecting said radiator with the water circulating system of a motor vehicle, valves for closing off said connections, an independent heating means carried by said radiator and located to supply heat to the rear portion of said lower header, a baffle mounted in said lower header between the front and rear portions thereof and projecting downwardly from the top of the lower header to within a short distance from the bottom of the lower header, and means for directing a current of air against said finned tubes.

4. In an automobile, a dashboard having an opening therethrough, a pair of water conduits mounted on said dashboard and projecting rearwardly therefrom, a hot water radiator located rearwardly of said opening and swivelly connected to said conduits, closure means for said opening, a fan carried by said radiator and located at the rear thereof to blow air therethrough, closure means for the front of said radiator, said two closure means being so correlated that when said radiator is swung on its swivelled connections to face said dashboard opening, said closure means may be opened to form guides assisting in conveying air from said radiator to said dashboard opening.

5. In a vehicle having a water cooled engine and a dashboard, a heater comprising a pair of supporting conduits mounted in said dashboard and projecting rearwardly therefrom, means for connecting said conduits with the water cooling system of said engine, a hot water radiator connected to said conduits, a fan mounted to blow air through said radiator, an independent heating means mounted to heat a portion of said radiator, said conduits each including forward and rear shut-off valves and detachable connections between said valves.

6. In a heater for an automotive vehicle powered by an internal combustion engine, a radiator, a fan mounted at one side of said radiator for movement therewith and for forcing air therethrough, a pair of water conduits connected to said internal combustion engine and to said radiator to support the latter, swivel joints in said conduits adjacent said radiator, valves in said conduits, and an independent heater mounted for movement with said radiator and in heat exchange relationship therewith.

PERRY BROWN.